United States Patent [19]
Matsumoto et al.

[11] Patent Number: 5,856,733
[45] Date of Patent: Jan. 5, 1999

[54] POSITIONING APPARATUS

[75] Inventors: Takashi Matsumoto, Yokohama; Yoshinori Satoh, Yokosuka; Hiroyuki Ureshino, Nakano-ku; Eiji Takahashi, Nakano-ku; Kouji Iwahashi, Nakano-ku, all of Japan

[73] Assignees: Nissan Motor Co., Ltd., Yokohama; Calsonic Corp., Tokyo, both of Japan

[21] Appl. No.: 738,530

[22] Filed: Oct. 28, 1996

[30] Foreign Application Priority Data

Oct. 27, 1995 [JP] Japan ................................ 7-280407

[51] Int. Cl.⁶ .............................. G05B 1/06; G05D 3/12
[52] U.S. Cl. ..................... 318/663; 318/653; 318/666; 318/604
[58] Field of Search ...................... 318/560, 638, 318/652, 653, 663, 665, 666, 670, 600, 601, 602, 604, 605

[56] References Cited

U.S. PATENT DOCUMENTS

| | | |
|---|---|---|
| 3,418,547 | 12/1968 | Dudler . |
| 3,764,786 | 10/1973 | Vawter et al. ................. 318/570 X |
| 4,543,077 | 9/1985 | Yamamuro et al. ................. 474/12 |
| 4,549,124 | 10/1985 | Beier ................................ 318/663 |
| 4,712,053 | 12/1987 | Numata ............................ 318/663 |
| 5,389,864 | 2/1995 | Tryan et al. ..................... 318/562 |

FOREIGN PATENT DOCUMENTS

30 19 725  12/1981  Germany .

*Primary Examiner*—Bentsu Ro
*Attorney, Agent, or Firm*—Foley & Lardner

[57] ABSTRACT

The upper limit value and lower limit value of a control target value are alternately supplied to a single D/A converter in synchronism with a clock, an analog output from the D/A converter is compared with an output from a PBR serving as a position detector, and a motor is driven by the difference voltage, thereby positioning the control object. In this case, control of the moving direction and drive/stop of the motor is performed by a combination between the setting states of the upper and lower limit values and the polarity of the difference voltage, and the switching operation of the selector is stopped during a control operation, thereby making it possible to smoothly perform the control operation at a high speed. The control system can be digitized as a whole by detecting a position by an encoder, and integration of the system can be enhanced, thereby realizing a compact and stable control system.

19 Claims, 9 Drawing Sheets

| SWITCHING CIRCUIT OUTPUT \ COMPARATOR OUTPUT | Lo | Hi |
|---|---|---|
| Lo | FORWARD ROTATION | STOP |
| Hi | STOP | REVERSE ROTATION |

| COMPARATOR OUTPUT / SWITCHING CIRCUIT OUTPUT | Lo (FORWARD ROTATION) | Hi (REVERSE ROTATION) |
|---|---|---|
| Lo | ON | OFF |
| Hi | OFF | ON |

POSITIONING APPARATUS

BACKGROUND OF THE INVENTION

1. Field of the Invention

The present invention relates to feedback control of a drive device such as a motor which stops a control object at a target position.

2. Description of the Related Art

Figure 1:
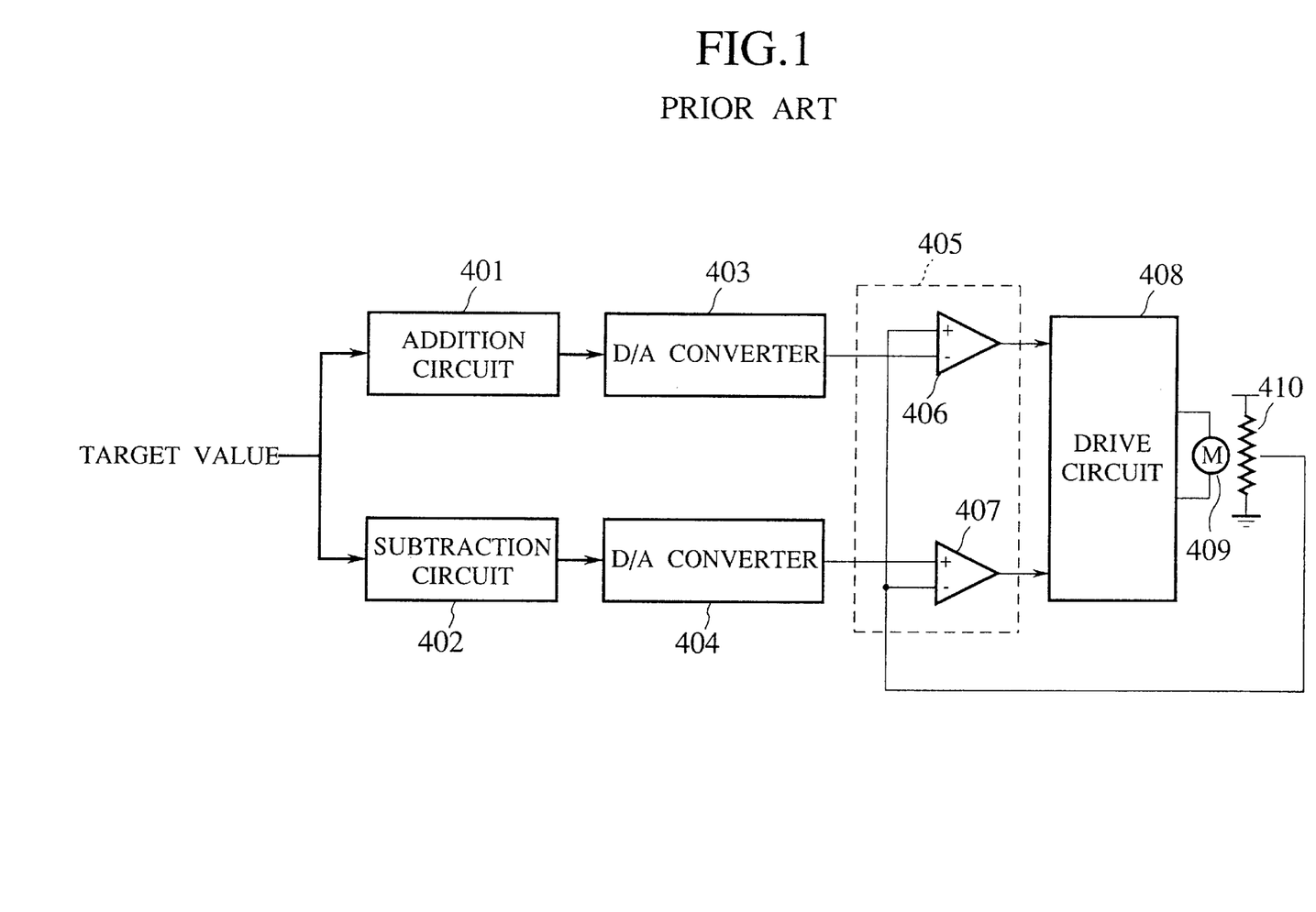
FIG. 1 is a block diagram showing the arrangement of a conventional positioning apparatus.

Conventionally, when the position of a control object is to be set, for example, when control is performed such that a control object such as a lever rotated about one point is rotated to a target position, a positioning apparatus having an arrangement shown in FIG. 1 in which the target position is given as a digital value to cause a motor to move the control target to a position near the target position is generally used.

This conventional positioning apparatus comprises an addition circuit 401 for adding a predetermined value to a target value given as a digital value to obtain an upper limit value, a subtraction circuit 402 for subtracting a predetermined value from the target value to obtain a lower limit value, two D/A (digital/analog) converters 403 and 404 for converting the upper and lower limit values into analog values, respectively, a window comparator 405 having outputs from the D/A converters 403 and 404 as two threshold values, and a drive circuit 408 which receives two outputs from the window comparator 405 to perform rotating (angular) control of a motor 409. Since the window comparator 405 receives an output from a PBR (Potentio Balance Resistor) 410 for detecting a present position of the motor 409 serving as a drive Means for moving the position of the control object, the drive circuit 408 checks the present position and the upper and lower limit values on the basis of the two outputs from the window comparator 405 to determine forward rotation, backward rotation or stop of the motor 409. More specifically, if the output from PBR 410 is larger then the upper limit value, the motor 409 is rotated in a direction to decrease the output value of the PBR 410. If the output from PBR 410 is smaller than the lower limit value, the motor 409 is rotated in a direction to increase the output value of the motor 409. In this manner, the output value of the PBR 410 is controlled to be stopped between the upper limit value and the lower limit value.

The interval between the upper limit value and the lower limit value, i.e., a stop range, must be set to be larger than the overrun amount of the control object from when the drive operation of the motor 409 is stopped to when the rotation of the motor 409 is actually stopped so as to prevent hunching.

As described above, in the conventional positioning apparatus, two D/A converters are required to convert the upper and lower limit values into analog values.

In the above arrangement, since the outputs from the two D/A converters independently vary, the interval between the upper limit value and the lower limit value which have been converted into analog values considerably varies in different converters.

Figure 2:
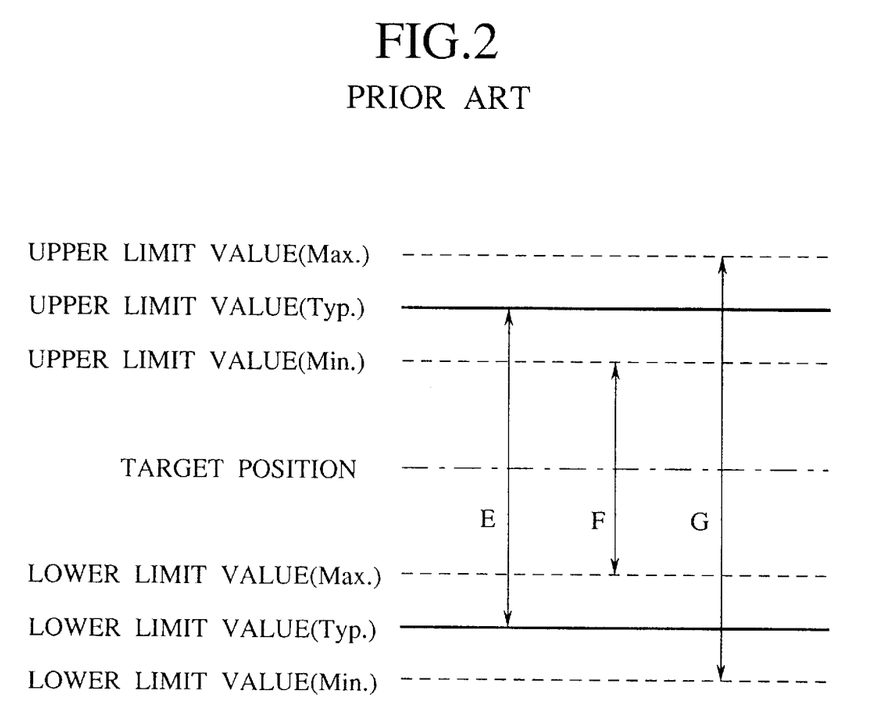
FIG. 2 is a level diagram showing the relationship between variations in output from a D/A converter and a stop range in a prior art.

FIG. 2 shows the relationship between variations in output from each D/A converter and the interval between an upper limit value and a lower limit value, i.e., a stop range. It is assumed that the value of an output from a D/A converter for converting the upper limit value into an analog amount is smaller than the target upper limit value, that the error is maximum, that the value of an output from a D/A converter for converting the lower limit value into an analog amount is larger than the target lower limit value, and that the error is maximum. In this case, the stop range has a minimum value (range F in FIG. 2). In contrast to this, it is assumed that the value of an output from a D/A converter for converting the upper limit value into an analog amount is larger than the target upper limit value, that the error is maximum that the value of an output from a D/A converter for converting the lower limit value into an analog amount is smaller than the target lower limit value, and that the error is maximum. In this case, the stop range has a maximum value (range G in FIG. 2).

To prevent hunching, the stop range must be larger than the overrun amount of the motor 409 serving as a control object. For this reason, in consideration of variations in D/A converters, addition/subtraction values for a target value must be set such that a set stop range (range E in FIG. 2) is not lower than the overrun amount of the motor 409 serving as a control object even if the stop range has the minimum value (range F in FIG. 2).

On the other hand, the maximum value of the stop range is a factor for determining stop precision for which the control object is stopped at a target position. More specifically, the stop precision which can be assured by a positioning apparatus is the maximum value (range G in FIG. 2) of the stop range determined in consideration of the variation in D/A converter, and this value must satisfy the required precision of a system using this positioning apparatus.

Therefore, when the overrun amount of the control object is close to the stop precision required by the system, prevention of hunching and assurance of the stop precision may not be achieved at once.

In addition, due to the presence of two D/A converters, a circuit scale extraordinarily increases with an increase in the number of bits of a digital value given as a target position. Therefore, problems such as an increase in cost and difficulty in integration are posed.

SUMMARY OF THE INVENTION

The present invention has been made to solve the above conventional problems, and has as its object to realize an inexpensive positioning apparatus without degrading precision thereof.

In order to achieve the above object, there is provided a positioning apparatus comprising: drive means for moving a position of a control object; position detection means for outputting a present position of the control object as a voltage: a switching circuit for alternately switching an output level to a high level or a low level in synchronism with a clock pulse; a standard values generating circuit for generating two types of voltage levels representing the upper and lower limit values of an input positioning target value; a selector for selecting any one of the upper and lower limit values in accordance with an output level of the switching circuit to output a selected value; comparison means for comparing the output from the selector with the output from the position detection means; and control determination means for determining drive contents of the drive means on the basis of an output from the comparison means.

As described above, according to the present invention, the upper and lower limit values of the control target value are synchronized with the cycle of a clock pulse, the switching operation of the selector is performed in accordance with a logical level, and the detection/control operation of an error signal related to the position of the control object with respect to the target value is performed in synchronism with the clock pulse. For this reason, the signal system including the means which are subsequent to the selector up to the drive means and include the comparison means can be constituted by a single system.

In a preferred embodiment of the present invention, the control determination means further inputs an output of the switching circuit and determines the drive contents of the drive means on the basis of the output of the switching circuit and the output from the comparison means.

In a preferred embodiment of the present invention, the control determination means instructs the drive means to move or rotate the control object in a direction to decrease the output from the position detection means when it is determined by the comparison means that the output from the position detection means is not less than the upper limit value, instructs the drive means to move or rotate the control object in a direction to increase the output from the position detection means when it is determined by the comparison means that the output from the position detection means is not more than the upper limit value, and instructs the drive means to stop movement of the control object when it is determined that the output from the position detection means is not more than the upper limit value or not less than the lower limit value.

According to this embodiment, since a negative feedback arrangement is established when the position of the control object is out of the range of the upper and lower limit values of the target value, the drive means is operated in a direction to reduce the error signal and set the target object within the range of the upper and lower limit values. However, this operation is performed together with the switching operation of the upper and lower limit values by the clock pulse, and, therefore, the control operation is intermittently performed in synchronism with the operation.

In order to achieve the above object, there is provided a positioning apparatus comprising: drive means for moving a position of a control object; position detection means for outputting a present position of the control object as a voltage; a switching circuit for alternately switching an output level to a high level or a low level in synchronism with a clock pulse when receiving a signal indicating OFF for operation of the drive means, and not switching the output level when receiving a signal indicating ON; a standard values generating circuit for generating two types of voltage levels representing the upper and lower limit values of an input positioning target value; a selector for selecting any one of the upper and lower limit values in accordance with an output level of the switching circuit to output a selected value; comparison means for comparing the output from the selector with the output from the position detection means; and an ON/OFF determination means for outputting an ON or OFF state to the drive means and the switching circuit in accordance with a logical output from the switching circuit and an output from the comparison means.

According to the present invention, the switching operation is stopped in a period in which a returning operation from a value being out of the range of the upper and lower limit values is performed, and the control operation is continuously performed in accordance with the stop of the switching operation. The value returns to a value being within the range, the returning operation is stopped, and the switching operation is restarted.

In a preferred embodiment of the present invention, the ON/OFF determination means permits the drive means to perform a drive operation when it is determined that the output from the position detection means is not less than the upper limit value or not more than the lower limit value, and inhibits the drive means to perform a drive operation when it is determined that the output from the position detection means is not more than the upper limit value or not less than the lower limit value.

In an another preferred embodiment of the present invention, the upper limit value is an output from an addition circuit for adding a predetermined value to an input set value, and the lower limit value is an output from a subtraction circuit for subtracting a predetermined value from the set value.

According to this preferred embodiment, outputs from the addition circuit and the subtraction circuit are connected to the selector to cause the addition and subtraction circuits to alternately perform an error signal detecting operation.

In an another preferred embodiment of the present invention, the upper limit value is an output from an addition circuit for adding a predetermined set value to an input set value, and the set value itself is used as the lower limit value.

In an another preferred embodiment of the present invention, an input set value itself is used as the upper limit value, and the lower limit value is an output from a subtraction circuit for subtracting a predetermined value from the set value.

According to there preferred embodiments, an input target value is used as the upper or lower limit value, and, as a circuit for generating the other limit value, only one of the addition circuit and the subtraction circuit is mounted.

In an another preferred embodiment of the present invention, the positioning apparatus further comprises: input unit for digitally setting the target value, and a D/A converter for converting the target value into an analog value before the target value is reached the comparison means; wherein: the standard values generating circuit is a digital circuit.

According to this preferred embodiment, a target value is digitally set, the standard values generating circuit for generating the upper and lower limit values are constituted by a digital circuit. Arithmetic results from the digital circuit are switched by the selector, converted into analog amounts by a D/A converter, and compared with position information from the control object, thereby detecting an error signal.

In an another preferred embodiment of the present invention, the position detection means is constituted by a potentio balance resistor.

According to this preferred embodiment, a potentio balance resistor serving as a rotation type variable resistor is used to detect the position of the control object, thereby directly converting an rotation angle into a voltage.

In an another preferred embodiment of the present invention, the position detection means is an encoder, and the comparison means is a digital comparator for comparing a digital output from the encoder with the digitally input set value.

According to this preferred embodiment, an encoder is used to detect a position, and position information of the control object is directly generated as a digital code. Therefore, the upper and lower limit values of the target value need not be converted into analog values, and the voltages are directly compared with each other by a digital comparator in a digital manner. The polarity (positive/negative) of a digital comparator output is checked to determine the forward movement/backward movement, and stop of the motor, thereby performing system control.

In order to achieve the above object, there is provided a positioning apparatus comprising: input unit for digitally setting an input positioning target value; drive means for moving a position of a control object; position detection means for outputting a present position of the control object as a voltage; a switching circuit for alternately switching an output level to a high level or a low level in synchronism with a clock pulse; an addition circuit for adding a predetermined value to the input positioning target value to generate upper limit value of the input positioning target value; a subtraction circuit for subtracting a predetermined value to the input positioning target value to generate lower limit value of the input positioning target value; a selector for selecting any one of the upper and lower limit values in accordance with an output level of the switching circuit to output a selected value; a D/A converter for converting the input positioning target value into an analog value; comparison means for comparing the output from the D/A converter with the output from the position detection means; and control determination means for instructing the drive means to move or rotate the control object in a direction to decrease the output from the position detection means when it is determined by the comparison means that the output from the position detection means is not less than the upper limit value, instructing the drive means to move or rotate the control object in a direction to increase the output from the position detection means when it is determined by the comparison means that the output from the position detection means is not more than the upper limit value, and instructing the drive means to stop movement of the control object when it is determined that the output from the position detection means is not more than the upper limit value or, not less than the lower limit value; wherein: the drive means comprises a drive circuit and a motor.

The nature principle and utility of the invention will become more apparent from the following detailed description when read in conjunction with the accompanying drawings.

DETAILED DESCRIPTION OF THE PREFERRED EMBODIMENTS

The present invention will be described below with reference to the accompanying drawings.

Embodiment 1

Figure 3:
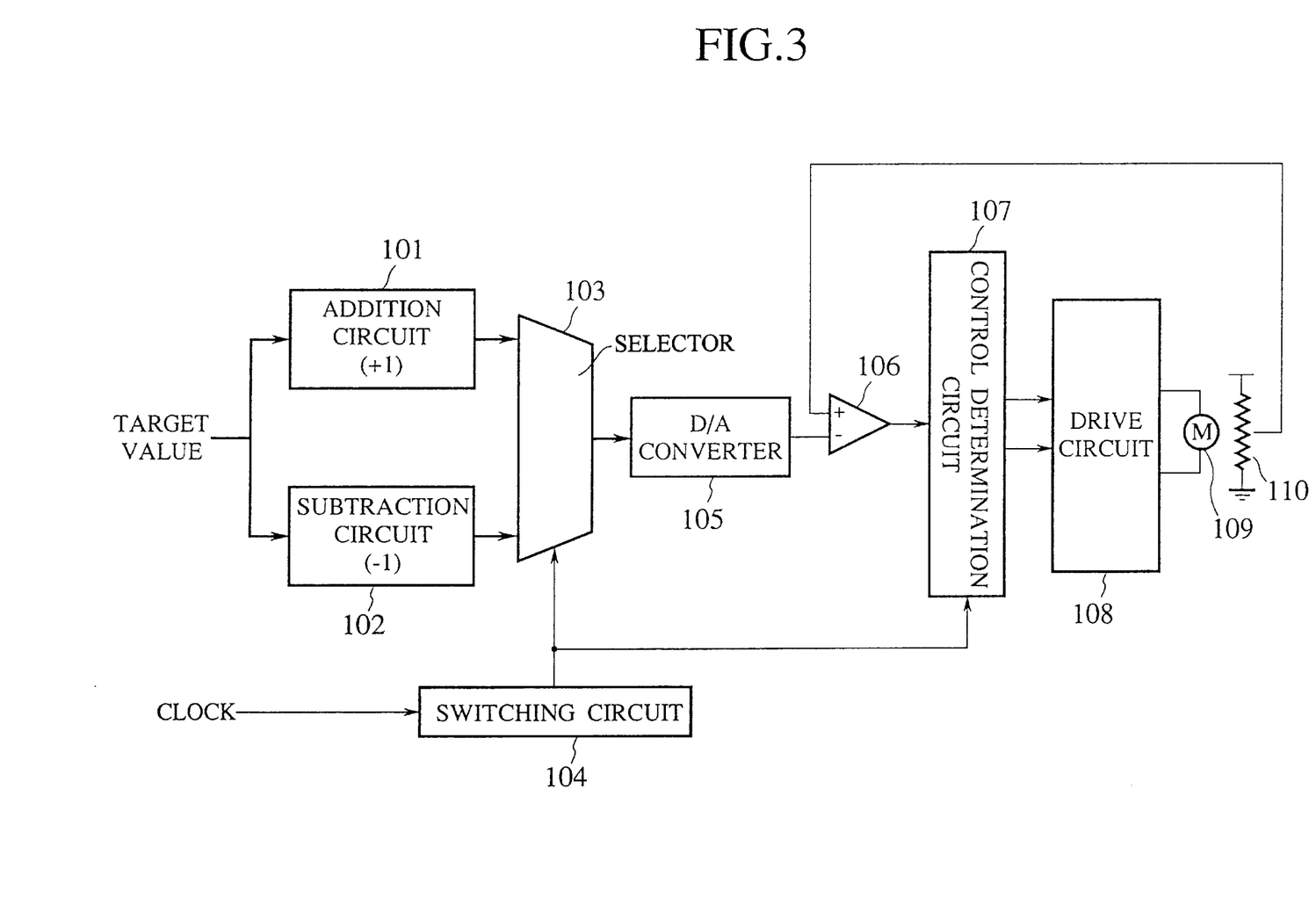
FIG. 3 is a view showing the arrangement of the first embodiment of the present invention.

FIG. 3 shows the first embodiment of the present invention. Referring to FIG. 3, a positioning apparatus is designed in such a manner that a motor 109 is driven while monitoring an output from a PBR 110 indicating a present position of a control object by a voltage to rotate the control object such as a lever and to make the control object close to a target position.

More specifically, the positioning apparatus comprises an addition circuit 101 for adding a predetermined value to a target value given as a digital value to obtain an upper limit value, a subtraction circuit 102 for subtracting a predetermined value from the target value to obtain a lower limit value, a switching circuit 104 for alternately switching an output to Hi(high)/Lo(low) in synchronism with a clock, a selector 103 which receives the upper limit value and the lower limit value to output any one of the upper limit value and the lower limit value in accordance with an output from the switching circuit 104, a D/A converter 105 for converting the output from the selector 103 into an analog value, a comparator 106 which receives an output from the PBR 110 as a non-inverted input and an output from the D/A converter 105 as an inverted input to compare the voltages of these inputs with each other and to output the difference between the voltages, a control determination circuit 107 for determining the forward rotation, backward rotation, or stop of the motor 109 in accordance with the output from the comparator 106 and an output from the switching circuit 104, and a drive circuit 108 for driving the motor 109 on the basis of an output from the control determination circuit 107.

Figure 4:
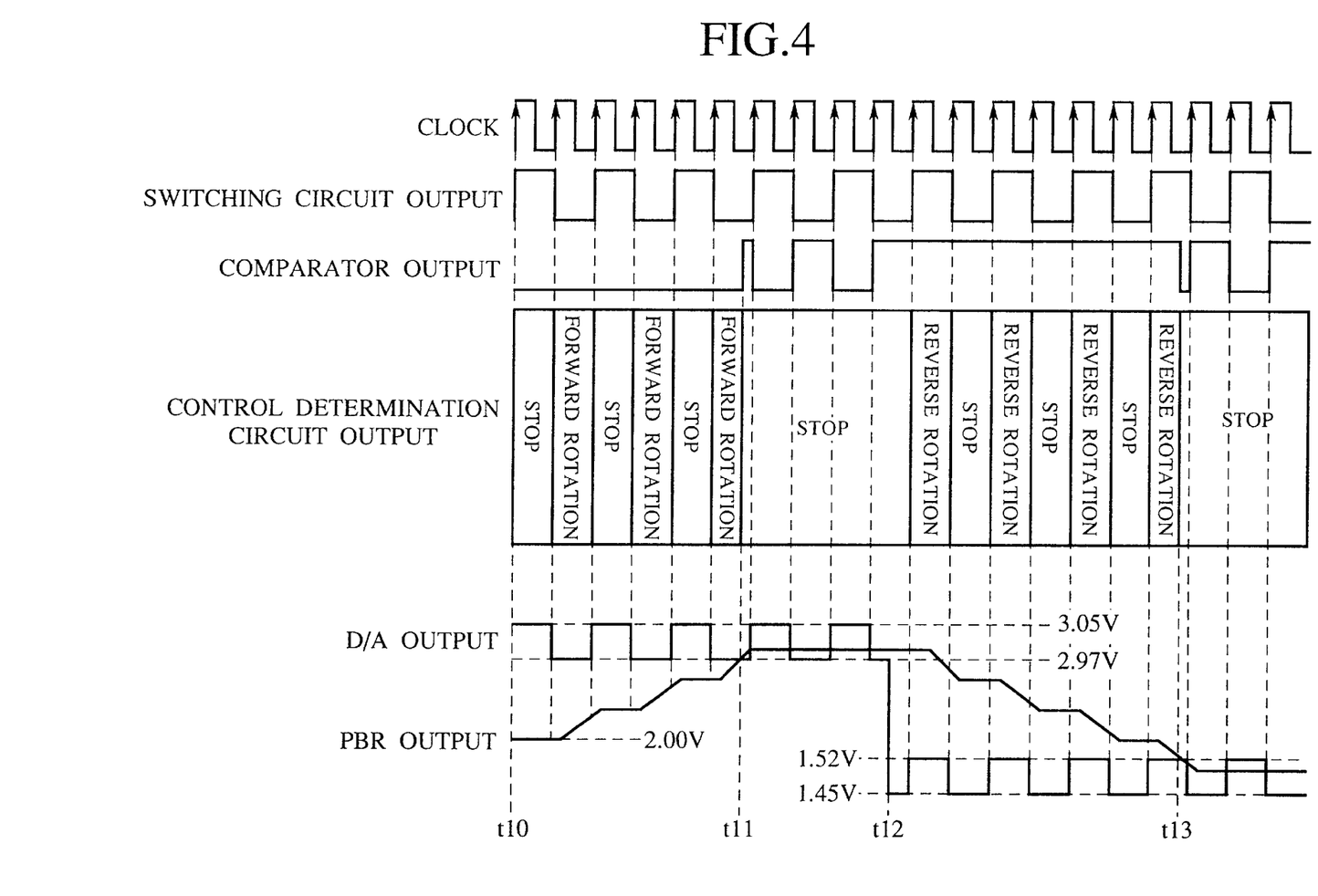
FIG. 4 is a timing chart of an operation in the first embodiment.

FIG. 4 shows the timing chart of an operation in the first embodiment. In this case, for example, output ranges of the PBR 110 and the D/A converter 105 are given by 0 to 5 V, a target value is given as 7-bit data (range of 0 to 5 V is divided by 128), the value which is subtracted and added by the addition circuit 101 and the subtraction circuit 102 are digital amounts of 1. The switching circuit 104 is designed to repeat inversion of an output each time a clock rises, and the selector 103 is designed to output the upper limit value when the output from the switching circuit 104 is at Hi, and the lower limit value when the output from the switching circuit 104 is at Lo.

Figure 5:
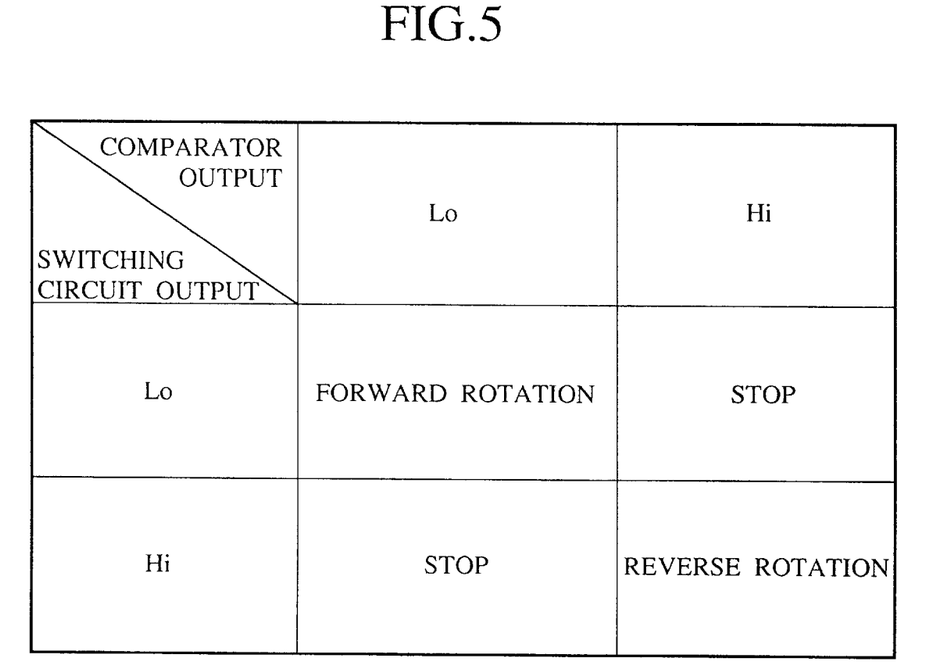
FIG. 5 is a table showing the relationship between the control state of a motor and a switching signal level in the first embodiment.

When the output from the switching circuit 104 is at Hi, i.e., when the upper limit value is selected, if the output from the comparator 106 is at Hi, the control determination circuit 107 determines that the value of the present position is larger than the upper limit value, and instructs the drive circuit 108 to rotate the motor 109 in a direction to decrease an output from the PBR 110 which indicates the present position. In contrast to this, when the output from the switching circuit 104 is at Lo, i.e., when the lower limit value is selected, if the output from the comparator 106 is at Lo, the control determination circuit 107 determines that the value of the present position is smaller than the lower limit value, and instruct the drive circuit 108 to rotate the motor 109 in a direction to increase an output from the PBR 110. In a case other than the above cases, the control determination circuit 107 instructs the drive circuit 108 to stop the motor 109. Note that, in this embodiment, the direction to increase the output from the PBR 110 is defined as forward rotation, and the direction to decrease the output from the PBR 110 is defined as backward rotation. FIG. 5 shows the relationship among the outputs from the switching circuit 104, the comparator 106, and the control determination circuit 107.

For example, referring to FIG. 4, when the output from the PBR 110, i.e., a voltage indicating the present position of the control object, is 2.00 V, if a target value is set to 77 (decimal notation) as a digital value, the following operation is performed.

The addition circuit 101 adds a digital value of 1 (one) to the target value to output 78 (decimal notation) as the upper limit value, and the subtraction circuit 102 subtracts a digital value of 1 (one) from the target value to output 76 (decimal notation) as the lower limit value. When the upper and lower limit values are input to the selector 103, the selector 103 selects one of the upper and lower limit values in accordance with the output from the switching circuit 104 whose logic is inverted each time a clock rises. Since the upper limit value of 78 is input to the D/A converter 105 when the output from the switching circuit 104 is at Hi, the output from the D/A converter 105 becomes 5 [V]×(78/128)=3.05 [V] because the digital input is 7-bit (128 steps) data. Since the lower limit value of 76 is input to the D/A converter 105 when the output from the switching circuit 104 is at Lo, the output from the D/A converter 105 becomes 5 [V]×(76/128) =2.97 [V].

When the output from the switching circuit 104 is at Hi (t10), the comparator 106 compares the upper limit value of 3.05 V with an output of 2.00 V from the PBR 110 indicating the present value to output Lo as a result. The control determination circuit 107 instructs the drive circuit 108 to stop the motor 109 in accordance with the rule in FIG. 5. The drive circuit 108 which receives the stop instruction stops the motor 109.

When the output from the switching circuit 104 is at Lo, comparator 106 compares the lower limit value of 2.97 V with an output of 2.00 V from the PBR 110 indicating the present value to output Lo also as a result. The control determination circuit 107 instructs the drive circuit 108 to forwardly rotate the motor 109 in accordance with the rule in FIG. 5. The drive circuit 108 which receives the forward rotation instruction rotates the motor 109 in a direction to increase the output value of the PBR 110.

Until the output value of the PBR 110 exceeds the lower limit value of 2.97 V, the above operation is repeated while the output from the switching circuit 104 is alternately switched to Hi/Lo. With this repetitive operation, when the output from the switching circuit 104 is at Lo, if it is detected that the output from the comparator 106 goes to Hi (t11), the control determination circuit 107 stops rotation of the motor 109 in accordance with the rule in FIG. 5. The motor 109 overruns to some extent, and then is stopped, and the output value of the PBR 110 falls between the upper limit value and the lower limit value, i.e., within the stop range. Thereafter, when the output from the switching circuit 104 is at either Hi or Lo, the control determination circuit 107 outputs a stop instruction to the drive circuit 108. For this reason, the motor 109 is not rotated unless an external force acts on the control object or the set target value is changed to make the output value of the PBR 110 out of the stop range.

In FIG. 4, at time t12, the target value is changed into 38 (1.48 V) in the decimal notation.

The addition circuit 101 adds a digital value of 1 (one) to the target value to output 39 (decimal notation) as the upper limit value, and the subtraction circuit 102 subtracts a digital value of 1 (one) from the target value to output 37 (decimal notation) as the lower limit value. When the output from the switching circuit 104 is at Hi, the upper limit value of 39 is input to the D/A converter 105. For this reason, the output from the D/A converter 105 is calculated as 5 [V]×(39/128) =1.52 [V] in the same manner as described above because 7 bits is 128 in the decimal rotation. When the output from the switching circuit 104 is at Lo, the lower limit value of 37 is input to the D/A converter 105. For this reason, the output from the D/A converter 105 is calculated as 5 [V]×(37/128) =1.45 [V].

When the output from the switching circuit 104 is at Hi, the comparator 106 compares the upper limit value of 1.52 V with an output of 3 V from the PBR 110 indicating the present value to output Hi as a result. The control determination circuit 107 instructs the drive circuit 108 to backwardly rotate the motor 109 in accordance with the rule in FIG. 5. The drive circuit 108 which receives the stop instruction backwardly rotates the motor 109 to rotate the target object in a direction to decrease the output value of the PBR 110.

When the output from the switching circuit 104 is at Lo, the comparator 106 compares the lower limit value of 1.45 V with an output from the PBR 110 indicating the present value to output Hi also as a result. The control determination circuit 107 instructs the drive circuit 108 to stop the motor 109 in accordance with the rule in FIG. 5. The drive circuit 108 which receives the stop instruction stops the motor 109.

Until the output value of the PBR 110 becomes lower than the upper limit value of 1.52 V, the above operation is repeated while the output from the switching circuit 104 is alternately switched to Hi/Lo. With this repetitive operation, when the output from the switching circuit 104 is at Hi, if it is detected that the output from the comparator 106 goes to Lo (t13), the control determination circuit 107 instructs the drive circuit 108 to stop the motor 109 in accordance with the rule in FIG 5. The motor 109 overruns to some extent, and then is stopped, and the output value of the PBR 110 falls between the upper limit value and the lower limit value, i.e.. within the stop range. Thereafter, when the output from the switching circuit 104 is at either Hi or Lo, the control determination circuit 10 outputs a stop instruction to the drive circuit 108. For this reason, the motor 109 is not rotated unless an external force acts on the control object or the set target value is charged to make the output value of the PBR 110 out of the stop range.

The above describes a case wherein a target value is set by a digital value, and comparison is performed by using analog values. When a reference voltage power supply, an analog addition circuit, an analog subtraction circuit, and an analog switch are applied, the entire control system can be constituted by an analog system as a matter of course.

Embodiment 2

Figure 6:
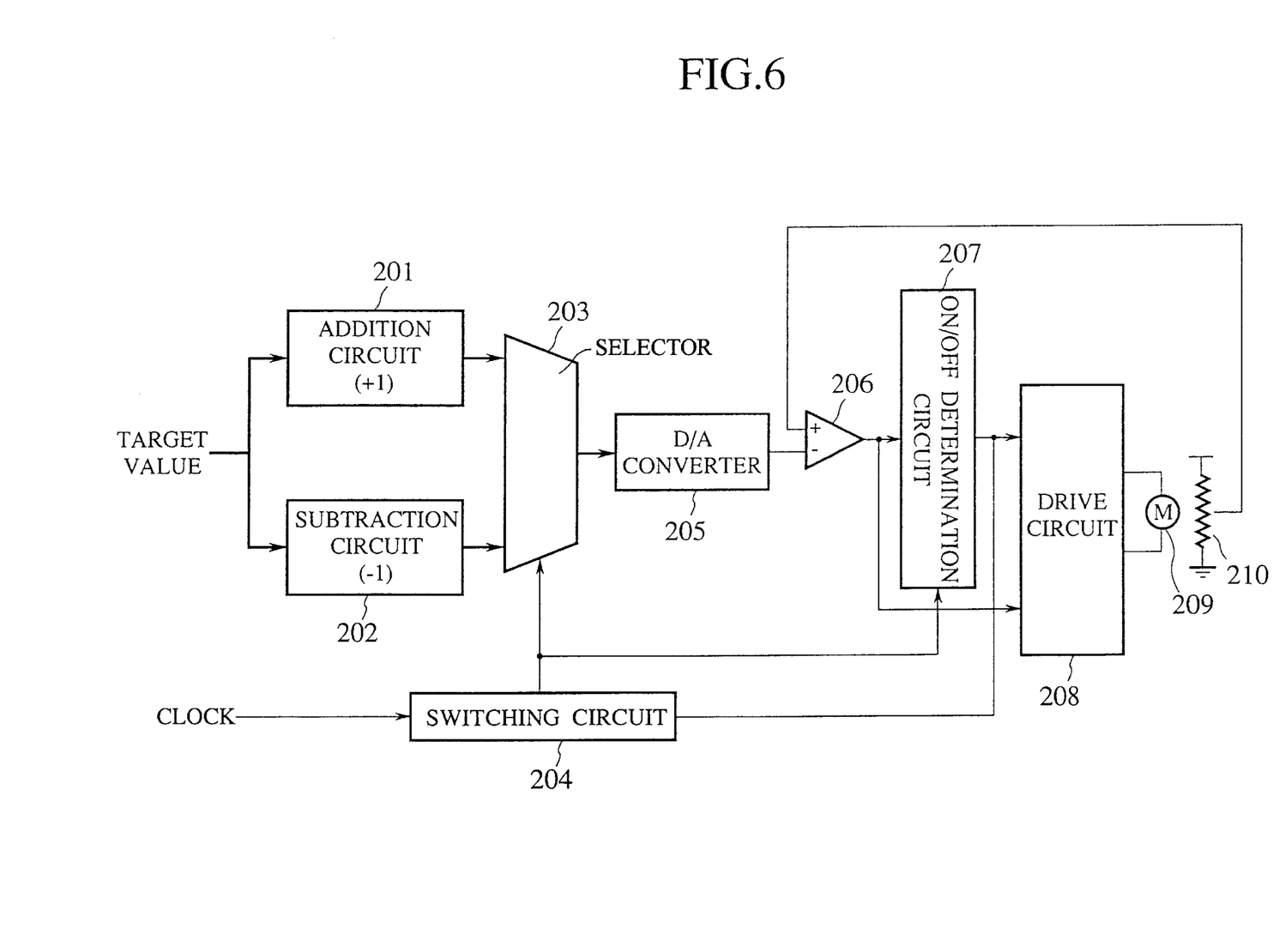
FIG. 6 is a block diagram showing the arrangement of the second embodiment of the present invention.

FIG. 6 shows the second embodiment. Although the arrangement of an addition circuit 201, a subtraction circuit 202, a switching circuit 204, a selector 203, a D/A converter 205, and a comparator 206 is the same as that in the first embodiment, an output from comparator 206 and an output from the switching circuit 204 are input to an ON/OFF determination circuit 207. An output from the ON/OFF determination circuit 207 is input to a drive circuit 208 as a signal instructing a motor 209 to be turned on/off. When the ON/OFF determination circuit 207 instructs the drive circuit 208 to turn on the motor 209, the ON/OFF determination circuit 207 inhibits the switching circuit 204 to switch an output. The drive circuit 208 receives an output from the comparator 206 the moment the ON/OFF determination circuit 207 outputs.

Figure 7:
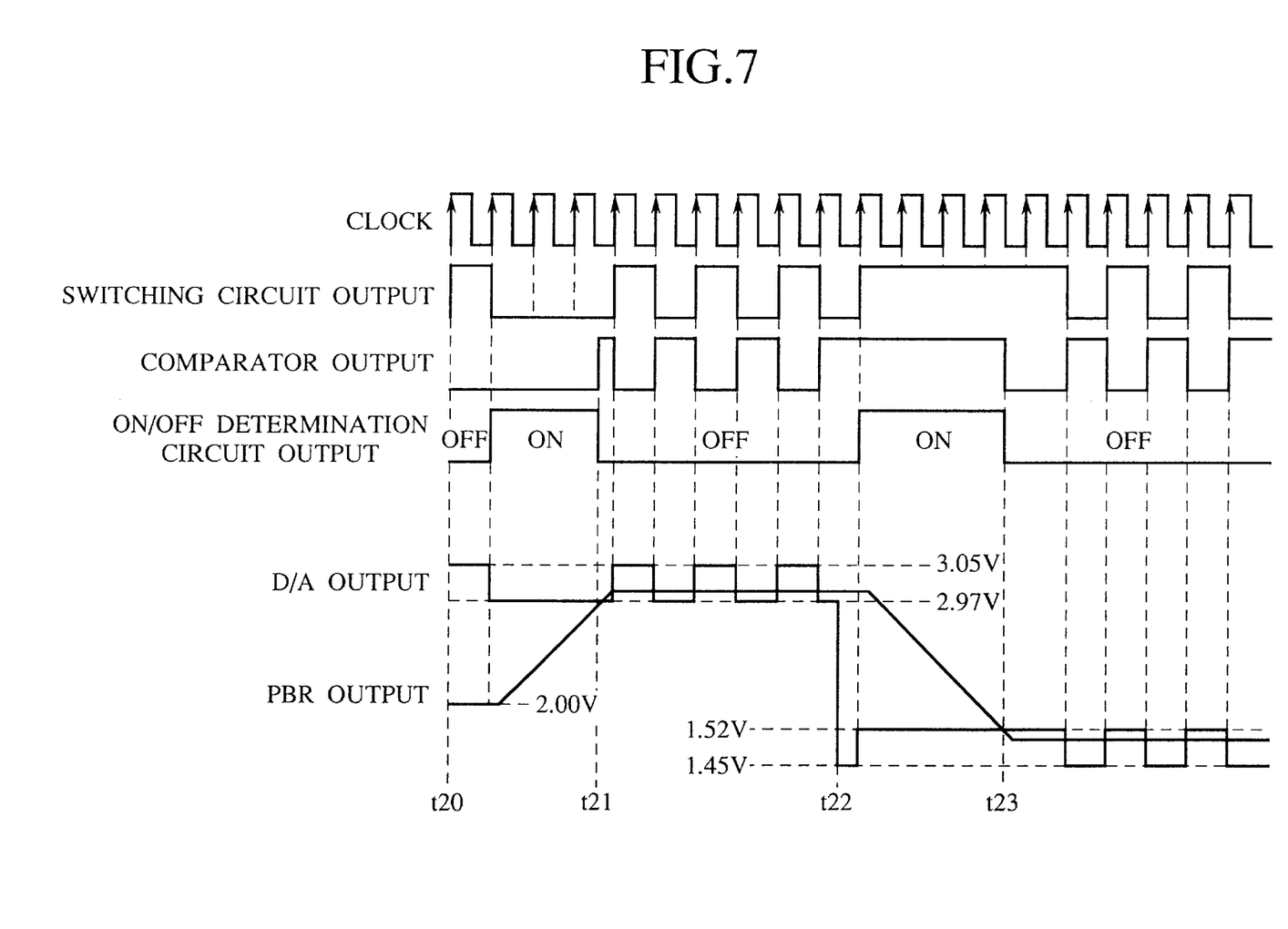
FIG. 7 is a timing chart of an operation in the second embodiment.

FIG. 7 shows the timing chart of an operation in the second embodiment. In this case, as in FIG. 4 showing the first embodiment, output ranges of the PBR 210 and the D/A converter 205 are given by 0 to 5 V, a target value is digitally set as 7-bit data (128 steps in the decimal notation), the value which is added and subtracted by the addition circuit 201 and the subtraction circuit 202 are digital amounts of 1 (one). The switching circuit 204 is designed to invert an output each time a clock rises, and the selector 203 is designed to output the upper limit value when the output from the switching circuit 204 is at Hi, and the lower limit value when the output from the switching circuit 204 is at Lo.

Figure 8:
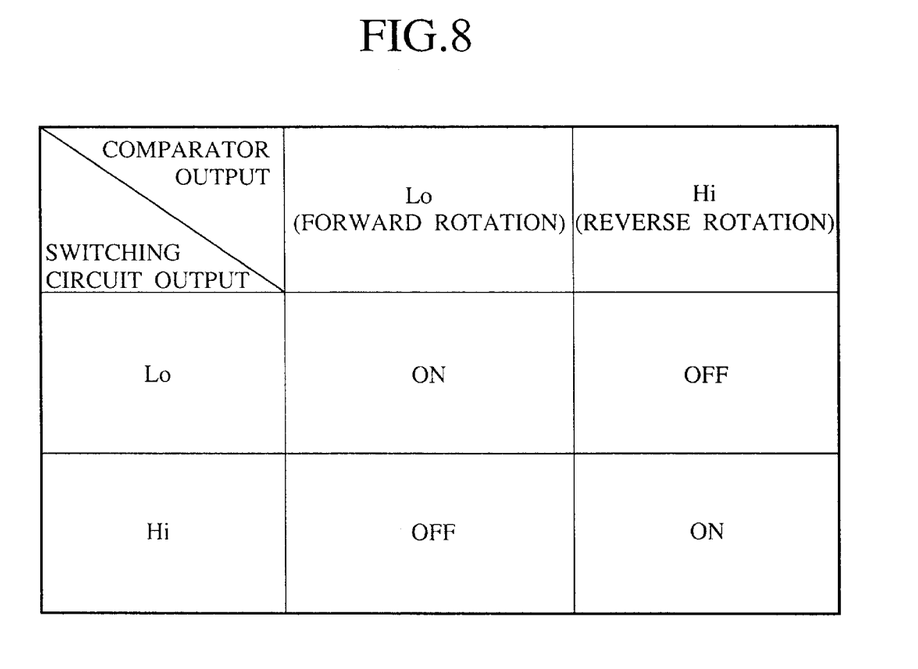
FIG. 8 is a table showing the relationship between the control state of a motor and a switching signal level in the second embodiment.

FIG. 8 shows an instruction from the ON/OFF determination circuit 207 to the drive circuit 208 which is instruction determined by outputs from the switching circuit 204 and the comparator 206. When the output from the switching circuit 204 is at Hi, i.e., when the upper limit value is selected, if the output from the comparator 206 is at Hi, the ON/OFF determination circuit 207 determines that the value of the present position is larger than the upper limit value, and outputs an ON instruction to the drive circuit 208 to rotate the motor 209 serving as a drive means. When the output from the switching circuit 204 is at Lo, i.e., when the lower limit value is selected,. if the output from the comparator 206 is at Lo, the ON/OFF determination circuit 207 determines that the value of the present position is smaller than the lower limit value, and outputs an ON instruction to the drive circuit 208 to rotate the motor 209. In a case other than the above cases, the ON/OFF determination circuit 207 outputs an OFF instruction to the drive circuit 208 to stop the motor 209. When the ON/OFF determination circuit 207 only outputs the ON (rotation) or OFF (stop) instruction to the drive circuit 208 without outputting an instruction for a direction in rotation, the drive circuit 208 determines a rotating direction, i.e., forward rotation/backward rotation in accordance with Hi/Lo of the output from the comparator 206. However, the ON/OFF determination circuit 207 outputs an OFF instruction, the motor 209 is stopped regardless of the output from the comparator 206.

For example, when the output from the PBR 210, i.e., a voltage indicating the present position of the control object, is 2.00 V, If a target value is set to 77 (decimal notation) as a digital value, the following operation is performed.

The addition circuit 201 adds a digital value of 1 (one) to the target value to output 78 (decimal notation) as the upper limit value, and the subtraction circuit 202 subtracts a digital value of 1 (one) from the target value to output 76 (decimal notation) as the lower limit value. The selector 203 which receives the upper and lower limit values outputs either the upper limit value or the lower limit value in accordance with the output from the switching circuit 204 whose logic is inverted each time a clock rises. Since the upper limit value of 78 is input to the D/A converter 205 when the output from the switching circuit 204 is at Hi, the output from the D/A converter 205 becomes 5 [V]×(78/128)=3.05 [V]. Since the lower limit value of 76 is input to the D/A converter 205 when the output from the switching circuit 204 is at Lo, the output from the D/A converter 205 becomes 5 [V]×(76/128) =2.97 [V].

When the output from the switching circuit 204 is at Hi (t20), the comparator 206 compares the upper limit value of 3.05 V with an output of 2.00 V from the PBR 210 indicating the present value to output Lo as a result. The ON/OFF determination circuit 207 instructs the drive circuit 208 to stop the motor 209 in accordance with the rule in FIG. 8. The drive circuit 208 which receives the stop instruction stops the motor 209.

When the output from the switching circuit 204 is at Lo, the comparator 206 compares the lower limit value of 2.97 V with an output of 2.00 V from the PBR 210 indicating the present value to output Lo also as a result. The ON/OFF determination circuit 207 outputs an ON instruction to the drive circuit 208 in accordance with the rule in FIG. 8, and, at the same time, the switching circuit 204 receives this signal to stop an inversion operation of the output. The drive circuit 208 receives the ON instruction rotates the motor 209 in a direction (in this case, forward rotation=direction to increase an output from the PBR 210) determined by the output from the comparator 206.

When the rotation of the motor 209 is started with the above operation, the output inversion operation of the switching circuit 204 is stopped, and the output from the selector 203 is fixed. For this reason, until the output value of the PBR 210 indicating the present position of the control object exceeds the lower limit value of 2.97 V, the motor 209 serving as a drive means is continuously rotated forward.

When the output from the comparator 206 goes to Hi, if it is detected that the output from the PBR 210 exceeds the lower limit value (t21), the ON/OFF determination circuit 207 stops rotation of the motor 209 in accordance with the rule in FIG. 8. The motor 209 overruns to some extent, and then is stopped, and the output value of the PBR 210 falls between the upper limit value and the lower limit value, i.e., within the stop range. Although the switching circuit 204 restarts its operation in synchronism with the clock, when the output from the switching circuit 204 is at either Hi or Lo, the ON/OFF determination circuit 207 outputs an OFF (stop) instruction to the drive circuit 208. For this reason, the motor 209 is not rotated unless an external force acts on the control object or the set target value is changed to make the output value of the PBR 210 out of the stop range.

In FIG. 7, at time t22, the target value is changed into 38 (decimal notation).

The addition circuit 201 adds a digital value of 1 (one) to the target value to output 39 as the upper limit value, and the subtraction circuit 202 subtracts a digital value of 1 (one) from the target value to output 37 (decimal notation) as the lower limit value. When the output from the switching circuit 204 is at Hi, the upper limit value of 39 (decimal notation) is input to the D/A converter 205. For this reason, the output from the D/A converter 205 is calculated as 5 [V]×(39/128)=1.52 [V]. When the output from the switching circuit 204 is at Lo, the lower limit value of 37 is input to the D/A converter 205. For this reason, the output from the D/A converter 205 is calculated as 5 [V]×(37/128)=1.45 [V] in the same manner as described above.

When the output from the switching circuit 204 is at Hi, the comparator 206 compares the upper limit value of 1.52 V with an output of 3 V from the PBR 210 indicating the present value to output Hi as a result. The ON/OFF determination circuit 207 outputs an ON (rotation) instruction to the drive circuit 208 in accordance with the rule in FIG. 8. The drive circuit 208 which receives the ON instruction rotates the motor 209 in a direction (in this case, reverse rotation=direction to decrease the output value of the PBR 210) determined by the output from comparator 206.

When the rotation of the PBR 21 is started, the output inversion operation of the switching circuit 204 is stopped, and the output from the selector 203 is fixed. For this reason, until the output value of the PBR 210 indicating the present position of the control object becomes smaller than the upper limit value of 1.52 V, the motor 209 is continuously rotated reversely.

When the output from the comparator 206 goes to Lo, if it is detected that the output from the comparator 206 becomes smaller than the upper limit value of 1.52 V (t23), the ON/OFF determination circuit 207 stops the rotation of the motor 209 in accordance with the rule in FIG. 8. The motor 209 overruns to some extent, and then is stopped, and the output value of the PBR 210 falls between the upper limit value and the lower limit value, i.e., within the stop range. Although the switching circuit 204 restarts its operation in synchronism with the clock again, when the output from the switching circuit 204 is at either Hi or Lo, the ON/OFF determination circuit 207 outputs an OFF (stop) instruction to the drive circuit 208. For this reason, the motor 209 is not rotated unless an external force acts on the control object or the set target value is changed to make the output value of the PBR 210 out of the stop range.

In the first embodiment, as shown in FIG. 4, since rotation/stop operations are repeated until the control object reaches a target position, a relatively long period of time is required to cause the control object to reach the target position, or the movement of the control object is intermittent without smoothness. However, in the second embodiment, since the output inversion operation of the switching circuit 204 is stopped while the motor 209 is rotated, the motor 209 is continuously rotated until the control object reaches the target position, and the control object can smoothly reaches the target position within a relatively short time.

Figure 9:
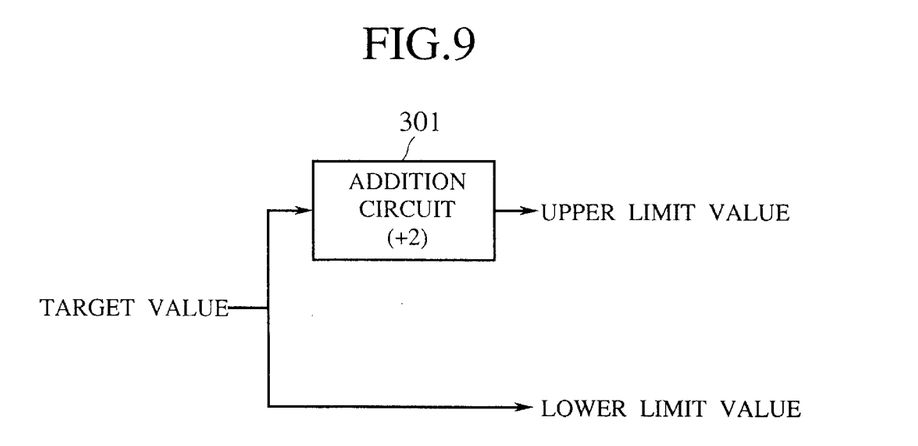
FIG. 9 is a block diagram showing another arrangement for generating a upper limit value and a lower limit value.

FIG. 9 shows another arrangement used when an upper limit value and a lower limit value are determined. In the second embodiment, the upper and lower limit values are determined by the addition circuit for adding a digital value of 1 (one) to a target position and the subtraction circuit for subtracting a digital value of 1 (one) from the target position. However, referring to FIG. 9, the target value itself is set as the lower limit value, and an output from an addition circuit 301 for adding 2 (i.e., 10 in the binary notation) to the target value is used as the upper limit value. In the first and second embodiments, an addition circuit and a subtraction circuit are required. However, when the arrangement shown in FIG. 9 is used, only an addition circuit is required, and a circuit scale can be reduced. In the first and second embodiments, a given target value coincides with an intermediate value of the upper and lower limit values. However, in the arrangement shown in FIG. 9, the intermediate value of the upper and lower limit values coincides with a value obtained by adding a digital value of 1 (one) to a given target value, this value is substantially used as the target value.

Figure 10:
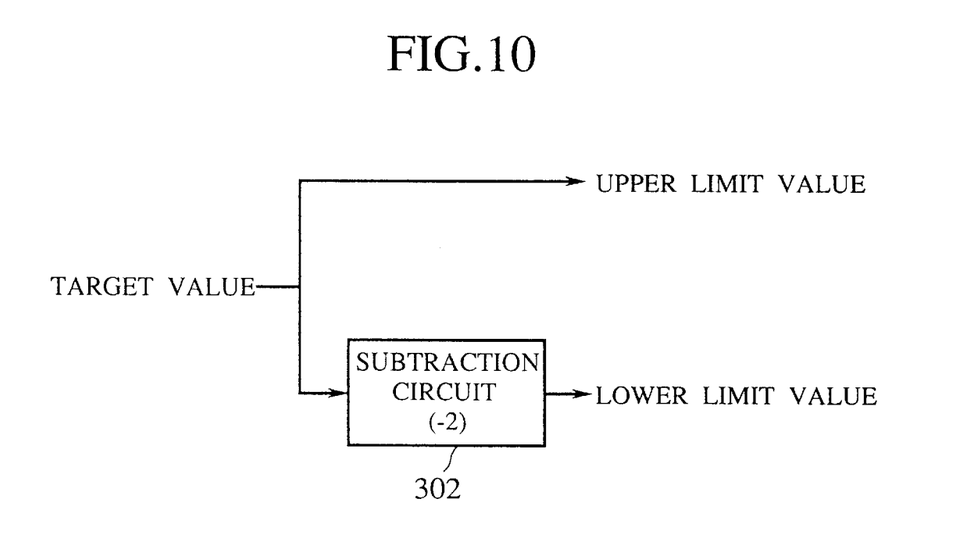
FIG. 10 is a block diagram showing still another arrangement for generating an upper limit value and a lower limit value.

In addition, as shown in FIG. 10, when an output from a subtraction circuit 302 for subtracting 2 from a target value is used as the lower limit value, and the target value itself is used as the upper limit value, a circuit scale smaller than that in the first or second embodiment as in FIG. 9.

In the arrangement described above, as in the first embodiment, all the processes can be performed without converting an analog signal into a digital signal as a matter of course.

Embodiment 3

In FIGS. 3 and 6, when encoders are applied in place of the PBR 110 and the PBR 210, the positions of the control objects can be directly output as digital values. In this manner, the upper and lower limit values can be directly compared with position information of the control object by a digital comparator without converting the upper and lower limit values into analog amounts by a D/A converter, thereby detecting an error. For example, when the level of a position signal of a control object is higher than the upper limit value of a target value, the control object is driven in a backward direction; when the level reaches a level being within the range of the target value, the drive of the control object is stopped. In contrast to this, when the level is lower than the lower limit value, the control object is driven in a forward direction; when the level reaches a level being within the range of the target value, the drive of the control object is stopped. In this case, a hysteresis is given to a detection level at which the level of the position signal reaches a level being within the range of the target value, a margin on a system operation can be assured, and control can be more stably performed.

Figure 11:
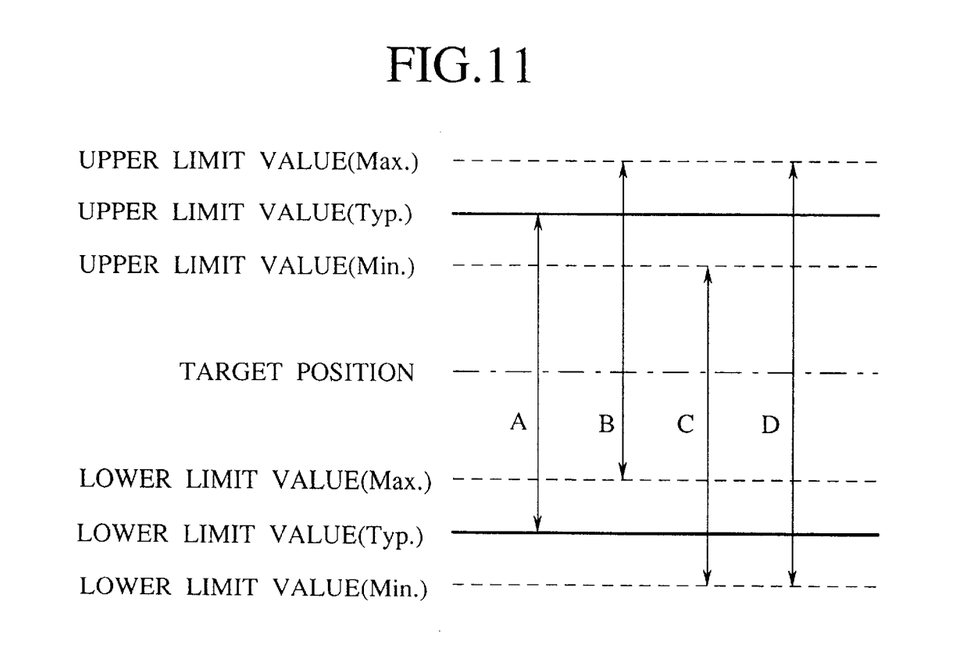
FIG. 11 is a level diagram showing the relationship between variations in output from D/A converter and a stop range in the present invention.

FIG. 11 shows the relationship between variations in output from a D/A converter and the Interval between an upper limit value and a lower limit value, i.e., a stop range. In this embodiment, since the upper and lower limit values are output from one D/A converter, the upper and lower limit values do not independently vary unlike the prior art shown in FIG. 2, and the relative variation between the upper and lower limit values is extremely small. More specifically, similar errors are generated while the interval between the upper and lower limit values is kept constant (ranges B and C in FIG. 11). This means that a variation in stop range is extremely small. Prevention of hunching can be realized by addition and subtraction values which are smaller than those of the prior art, i.e., within a stop range (range A in FIG. 11) small than that of the prior art. As a result, stop precision which can be assured by the positioning apparatus can be improved compared with the prior art (range D in FIG. 11).

In addition, the degree of an increase in circuit scale with increase in the number of bits of the target position is lower than that of the prior art because only one D/A converter is used, problems such as an increase in cost and difficulty in integration are not posed.

As has been described above, according to embodiments 1 and 2, a single D/A converter is arranged, the digital input of the target value is alternately switched to the upper limit value and the lower limit value in synchronism with a clock to determine the present position of the control object and the magnitude relationship between the present position of the control object and the upper and lower limit, thereby determining the forward movement (forward rotation)/backward movement (reverse rotation)/stop of the drive means. Therefore, only an advantage that a variation in stop range caused by variations in characteristics of a plurality of D/A converters can be reduced to improve control precision, but also an advantage that a reduction in cost can be achieved.

Particularly, according to embodiment 2, since the switching operation of the selector is stopped while a control operation is performed, the control object is smoothly and rapidly moved compared with the control object in the first embodiment.

In the arrangement according to the modified embodiment of embodiment 1 or 2, any one of the addition circuit and the subtraction circuit is removed, a circuit scale which is smaller than that in embodiment 1 and 2 can be obtained.

According to embodiment 3, since the circuit is digitized as a whole, a problem that a variation in output from a D/A converter can be completely solved, and a stable operation can also be performed. The digitization of the whole circuit makes it easy to integrate the control circuit on an IC, and, finally, the control circuit can be constituted by one chip.

It should be understood that many modifications and adaptations of the invention will become apparent to those skilled in the art and it is intended to encompass such obvious modifications and changes in the scope of the claims appended hereto.

What is claimed is:

1. A positioning apparatus, comprising:

drive means for moving a position of a control object;

position detection means for outputting a present position of the control object as a voltage:

a switching circuit for alternately switching an output level to a high level or a low level in synchronism with a clock pulse;

a standard values generating circuit for generating two types of voltage levels representing the upper and lower limit values of an input positioning target value;

a selector for selecting any one of the upper and lower limit values in accordance with an output level of said switching circuit to output a selected value:

comparison means for comparing the output from said selector with the output from said position detection means; and control determination means for determining drive contents of said drive means on the basis of an output from said comparison means.

2. A positioning apparatus according to claim 1, wherein:

said control determination means further inputs an output of said switching circuit and determines the drive contents of said drive means on the basis of the output of said switching circuit and the output from said comparison means.

3. A positioning apparatus according to claim 2, wherein:

said control determination means instructs said drive means to move or rotate the control object in a direction to decrease the output from said position detection means when it is determined by said comparison means that the output from said position detection means is not less than the upper limit value, instructs said drive means to move or rotate the control object in a direction to increase the output from said position detection means when it is determined by said comparison means that the output from said position detection means is not more than the lower limit value, and instructs said drive means to stop movement of the control object when it is determined that the output from said position detection means is not more than the upper limit value or not less than the lower limit value.

4. A positioning apparatus according to claim 1, wherein:

said control determination means instructs said drive means to move or rotate the control object in a direction to decrease the output from said position detection means when it is determined by said comparison means that the output from said position detection means is not less than the upper limit value, instructs said drive means to move or rotate the control object in a direction to increase the output from said position detection means when it is determined by said comparison means that the output from said position detection means is not more than the lower limit value, and instructs said drive means to stop movement of the control object when it is determined that the output from said position detection means is not more than the upper limit value or not less than the lower limit value.

5. A positioning apparatus according to claim 1, wherein:

the upper limit value is an output from an addition circuit for adding a predetermined value to an input set value, and the lower limit value is an output from a subtraction circuit for subtracting a predetermined value from the set value.

6. A positioning apparatus according to claim 1, wherein:

the upper limit value is an output from an addition circuit for adding a predetermined set value to an input set value, and the input set value itself is used as the lower limit value.

7. A positioning apparatus according to claim 1, wherein:

an input set value itself is used as the upper limit value, and the lower limit value is an output from a subtraction circuit for subtracting a predetermined value from the set value.

8. A positioning apparatus according to claim 1, further comprising:

input unit for digitally setting the target value; and a D/A converter for converting the target value into an analog value before the target value is reached said comparison means; wherein:

said standard values generating circuit is a digital circuit.

9. A positioning apparatus according to claim 1, wherein:

said position detection means is constituted by a potentio balance resistor.

10. A positioning apparatus according to claim 1, wherein:

said position detection means is an encoder and said comparison means is a digital comparator for comparing a digital output from said encoder with the digitally input set value.

11. A positioning apparatus, comprising:

drive means for moving a position of a control object;

position detection means for outputting a present position of the control object as a voltage;

a switching circuit for alternately switching an output level to a high level or a low level in synchronism with a clock pulse when receiving a signal indicating OFF for operation of said drive means, and not switching the output level when receiving a signal indicating ON;

a standard values generating circuit for generating two types of voltage levels representing the upper and lower limit values of an input positioning target value;

a selector for selecting any one of the upper and lower limit values in accordance with an output level of said switching circuit to output a selected value;

comparison means for comparing the output from said selector with the output from said position detection means; and an ON/OFF determination means for outputting an ON or OFF state to said drive means and said switching circuit in accordance with a logical output from said switching circuit and an output from said comparison means.

12. A positioning apparatus according to claim 11, wherein:

said ON/OFF determination means permits said drive means to perform a drive operation when it is determined that the output from said position detection means is not less than the upper limit value or not more than the lower limit value, and inhibits said drive means to perform a drive operation when it is determined that the output from said position detection means is not more than the upper limit value or not less than the lower limit value.

13. A positioning apparatus according to claim 11, wherein:

the upper limit value is an output from an addition circuit for adding a predetermined value to an input set value, and the lower limit value is an output from a subtraction circuit for subtracting a predetermined value from the set value.

14. A positioning apparatus according to claim 11, wherein:

the upper limit value is an output from an addition circuit for adding a predetermined set value to an input set value, and the input set value itself is used as the lower limit value.

15. A positioning apparatus according to claim 11, wherein:

an input set value itself is used as the upper limit value, and the lower limit value is an output from a subtraction circuit for subtracting a predetermined value from the set value.

16. A positioning apparatus according to claim 11, further comprising:

input unit for digitally setting the target value; and a D/A converter for converting the target value into an analog value before the target value is reached said comparison means; wherein:

said standard values generating circuit is a digital circuit.

17. A positioning apparatus according to claim 11, wherein:

said position detection means is constituted by a potentio balance resistor.

18. A positioning apparatus according to claim 11, wherein:

said position detection means is an encoder and said comparison means is a digital comparator for comparing a digital output from said encoder with the digitally input set value.

19. A positioning apparatus, comprising:

input unit for digitally setting an input positioning target value;

drive means for moving a position of a control object;

position detection means for outputting a present position of the control object as a voltage;

a switching circuit for alternately switching an output level to a high level or a low level in synchronism with a clock pulse;

an addition circuit for adding a predetermined value to the input positioning target value to generate upper limit value of the input positioning target value;

a subtraction circuit for subtracting a predetermined value to the input positioning target value to generate lower limit value of the input positioning target value;

a selector for selecting any one of the upper and lower limit values in accordance with an output level of said switching circuit to output a selected value;

a D/A converter for converting the input positioning target value into an analog value;

comparison means for comparing the output from said D/A converter with the output from said position detection means; and control determination means for instructing said drive means to move or rotate the control object in a direction to decrease the output from said position detection means when it is determined by said comparison means that the output from said position detection means is not less than the upper limit value, instructing said drive means to move or rotate the control object in a direction to increase the output from said position detection means when it is determined by said comparison means that the output from said position detection means is not more than the lower limit value, and instructing said drive means to stop movement of the control object when it is determined that the output from said position detection means is not more them the upper limit value or not less than the lower limit value; wherein:

said drive means comprises a drive circuit and a motor.

* * * * *